United States Patent [19]

Treharne et al.

[11] Patent Number: 5,416,471
[45] Date of Patent: May 16, 1995

[54] METHOD AND APPARATUS FOR PROGRAMMING A SPARE KEY INTO A SECURITY SYSTEM

[75] Inventors: William D. Treharne, Dearborn Heights; Ronald G. Moore, Troy, both of Mich.

[73] Assignee: Ford Motor Company, Dearborn, Mich.

[21] Appl. No.: 993,759

[22] Filed: Dec. 21, 1992

[51] Int. Cl.$^6$ .............................................. E05B 53/00
[52] U.S. Cl. ........................ 340/825.31; 340/825.34; 340/426; 70/278
[58] Field of Search ...................... 340/825.31, 825.34, 340/825.22, 426; 70/278

[56] References Cited

U.S. PATENT DOCUMENTS

| | | | |
|---|---|---|---|
| 4,209,782 | 6/1980 | Donath | 70/278 |
| 4,738,334 | 4/1988 | Weishaupt | 340/426 |
| 4,791,280 | 12/1988 | O'Connell et al. | 340/825.31 |
| 4,980,680 | 12/1990 | Knoll et al. | 340/825.31 |
| 4,990,906 | 2/1991 | Kell et al. | 340/825.31 |

FOREIGN PATENT DOCUMENTS 8000091 6/1979 European Pat. Off. .

OTHER PUBLICATIONS

PT Electrotechniek, Elecktronica, vol. 46, No. 3, 1 Mar. 1991, Rijswijk, NL, pp. 4–5 'elektronisch slot verlaat eeuwenoud principe'

Primary Examiner—Donald J. Yusko
Assistant Examiner—Brian Zimmerman
Attorney, Agent, or Firm—Kevin G. Mierzwa; Roger L. May

[57] ABSTRACT

A method for programming a spare key containing an electronic coded security code into the memory of a security system whereby a known key is inserted into the lock cylinder and the security device is triggered to read its encoded security code. If within a period of time an unknown key is inserted into the lock cylinder, the encoded security code of the unknown key is then inserted into the system memory. The new key security code becomes an additional acceptable security code to open the lock in response to receiving the first (authorized) security code.

2 Claims, 2 Drawing Sheets

METHOD AND APPARATUS FOR PROGRAMMING A SPARE KEY INTO A SECURITY SYSTEM

BACKGROUND OF THE INVENTION

The present invention relates generally to a key-activated security device and more specifically, to a method and apparatus to program the security device to recognize a spare key for an automotive vehicle.

Several security systems are available where a conventional key is combined with coded electronic circuitry to provide added security by increasing the total number possibilities able to satisfy the security device. However, the systems fail to disclose a convenient method for an end user to program a spare key into such a system.

For instance, U.S. Pat. No. 4,990,906 describes a microprocessor controlled programmable Vehicle anti-theft device, where the system memory is cleared during a new key programming sequence. The security code of the new key is then placed into the memory. The new key security code is the only security code retained, thus any previously programmed keys become invalid. Also in order to program the new key into the system, the inputs of the microprocessor must be varied in a fixed sequence which requires trained service personnel.

It would be desirable to have a security system which could easily be programmed by an end user and which could store several key code values rather than one key code value in memory.

SUMMARY OF THE INVENTION

The present invention is a method and apparatus wherein an end user programs a spare key into an automotive security system without using special equipment or trained personnel.

A spare key is cut to match an existing key which fits into a lock cylinder of the security system. The key also has electronic circuitry containing a code selected at random. The random code on the spare key is programmed into the memory of the security system by inserting a key having a security code which has been previously stored in the memory in the lock to initiate a timer. A spare key having the random code is inserted into the lock before the timer counts a predetermined time period. The respective electronic security code is then stored in the memory.

The device can also have a feature which will erase all the codes currently stored in the memory and program a new key value. The process requires several steps and takes over 45 minutes to help insure that an unauthorized key cannot be easily used to reprogram the memory. The process useful to clear the memory should a key become lost or to clear the memory when it has become full.

DETAILED DESCRIPTION OF THE INVENTION

Figure 1:
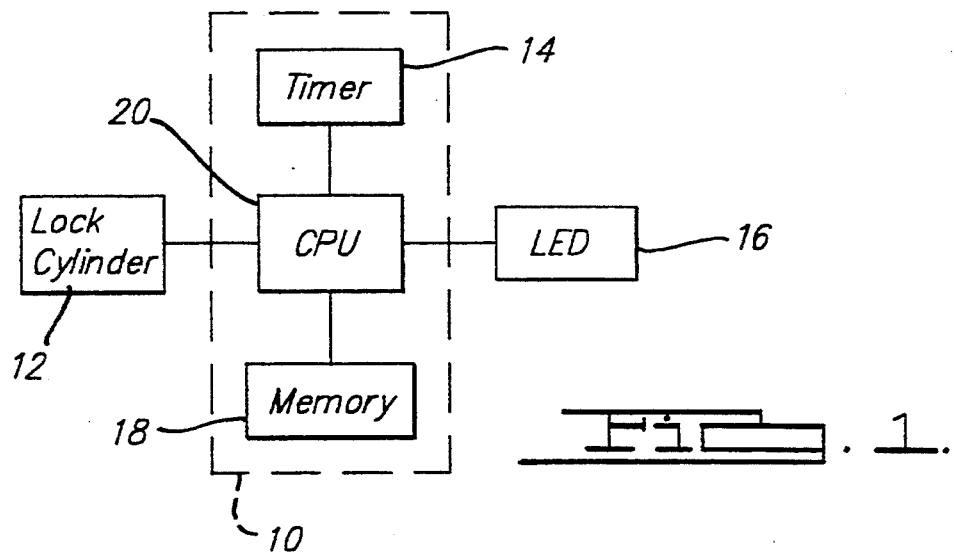
FIG. 1 is a block diagram of preferred hardware according to the invention.

Referring now to FIG. 1, a microprocessor 10 which controls the operation of the system has a timer 14, a CPU 20, and a memory 18. Although they are all shown as an integral part of the microprocessor 10 they could also be separate components. The memory 18 is a keep-alive memory which will not be cleared when power is removed. When a properly cut key is placed into the lock cylinder 12 and rotated to a predetermined position, such as the accessory position on the ignition switch of an automobile, the CPU 20 will be triggered to read the security code from the circuitry embedded in the head of the key. The security code from the key can be read by direct contact although the preferable way is to have the microprocessor 10 send an RF signal via a transmitter/receiver located in the steering column to a transponder located on the key. The transponder sends its encoded security code to the microprocessor of the security system via another RF signal. Once the CPU 20 receives the security code, it is compared with the security codes stored in the memory 18. A valid security code will satisfy the security system, which then will enable vehicle operation.

An LED 16 is used to provide feedback to the system user. For example, LED 16 will flash in a predetermined pattern if the code contained on the key matches a security code stored in memory.

Timer 14 is used in a program mode. When the program mode is entered, the user will have a finite amount of time to insert a new key to be programmed. Timer 14 may comprise an oscillator to provide pulses to be counted by CPU 20 establish a predetermined time.

Figure 2:
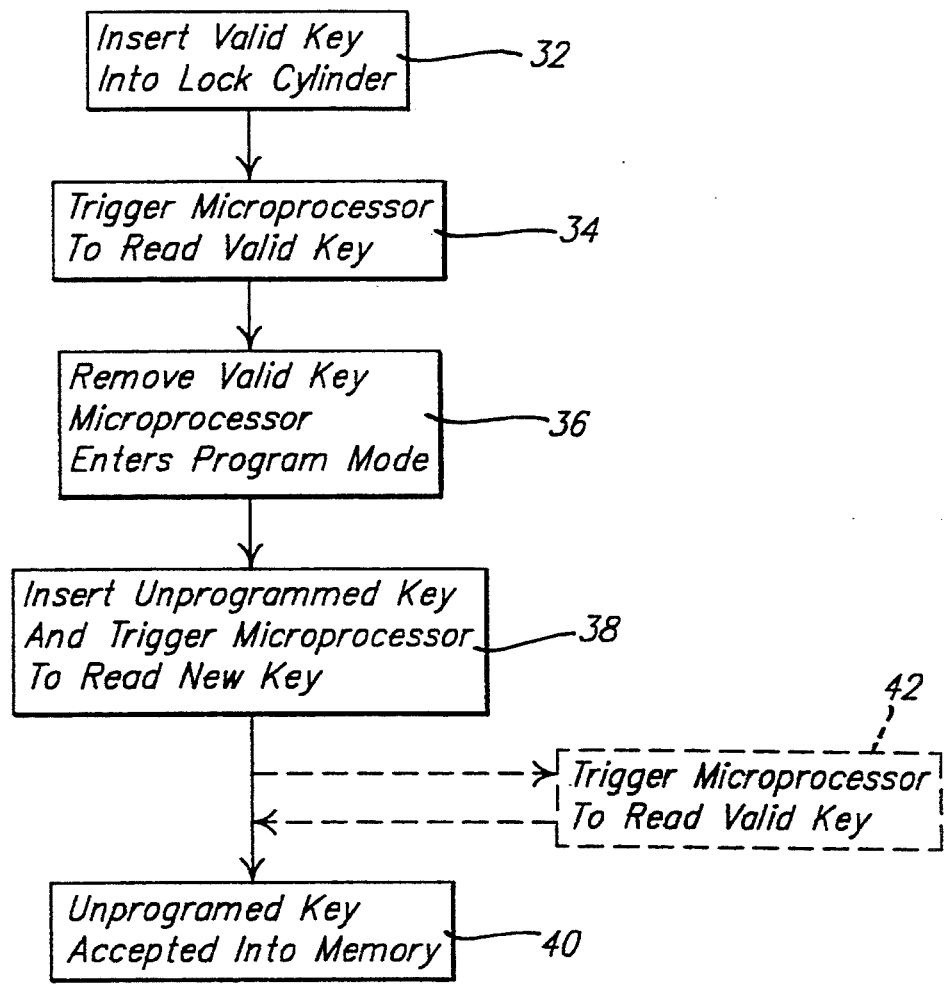
FIG. 2 is a flow chart showing of the method to program a spare key.

FIG. 2 shows the procedural steps used to program the security code of a previously cut key into the memory of the security device. The key must be a previously cut key in order to turn the lock cylinder.

In step 32, a valid key must be inserted into the lock cylinder 12. Preferably, one lock cylinder is used, but two or more lock cylinders may be used. In step 34, the key must be rotated to a predetermined position, for example the accessory position or ignition-on position of an automobile ignition switch, in order to trigger the CPU 20 to read the code from the key. Upon removal of the key in step 36, the CPU 20 enters program mode for a predetermined period of time. The period of time is less than the time it would take the authorized user of the vehicle to leave the area of the vehicle, such as about 10 seconds.

The programmed key is inserted in the lock cylinder 12 and rotated in step 38 to the predetermined position before the expiration of the predetermined time period. In step 40 the newly read security code is added to the memory.

In an alternative embodiment, an additional step 42 is performed between steps 38 and 40 wherein the initial security code must again be read prior to storing the newly read value. Thus, security is increased by waiting for a valid key to be inserted into the lock cylinder within a short period of time after the removal of the unprogrammed key from the lock cylinder. The period of time is preferably the same as in step 38. Once the valid key is reinserted into the lock cylinder in step 42, the new key security code is stored and accepted by the system in step 40.

Figure 3:
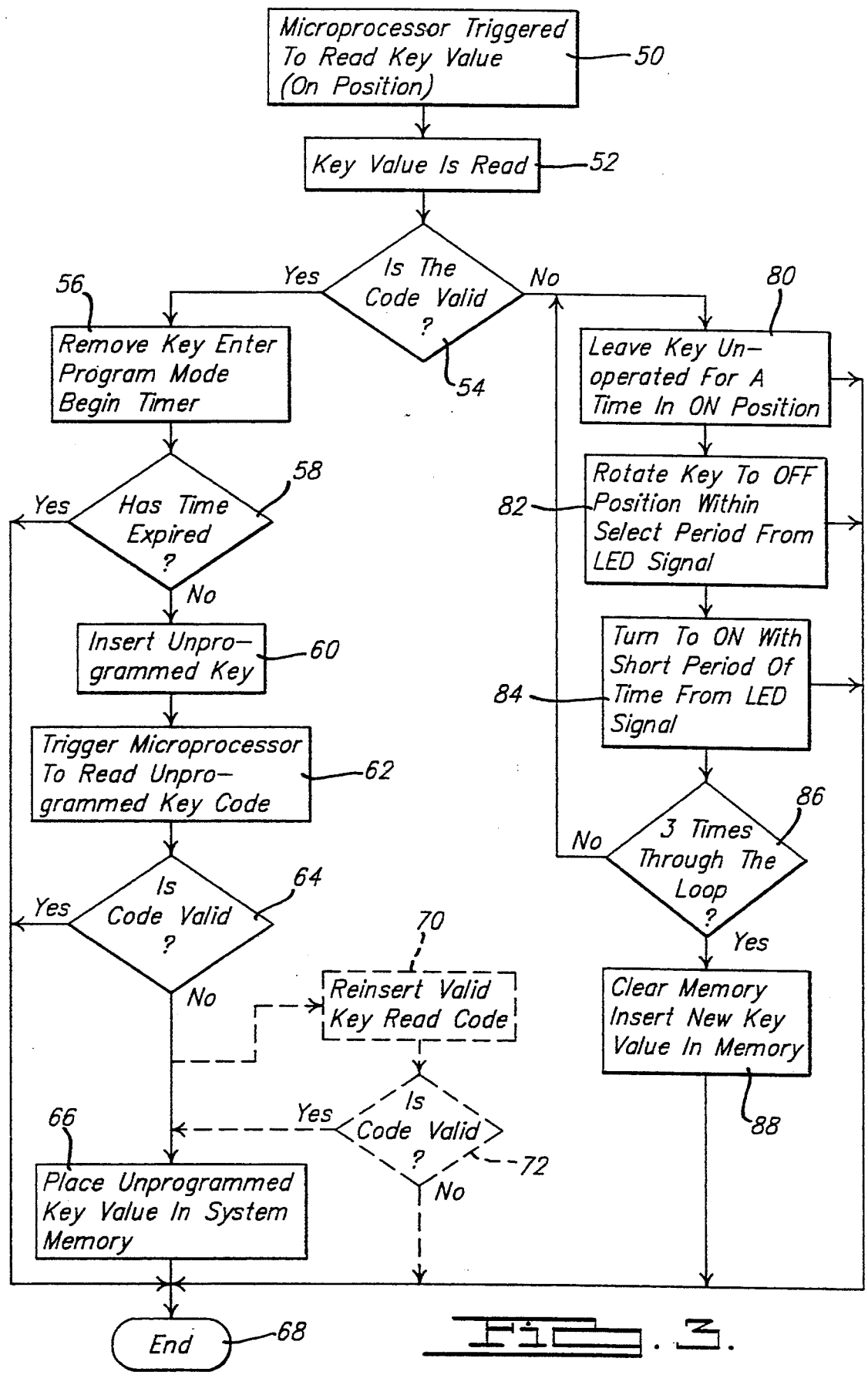
FIG. 3 is a flowchart showing the operation of the microprocessor of FIG. 1.

FIG. 3 shows a flow chart of the steps executed by the microprocessor to program a spare key. In step 50, a valid key is inserted into the lock cylinder and rotated causing the microprocessor to read the security code from the key. In step 52, the microprocessor receives the security code. The microprocessor in step 54 checks the security code received for validity by comparing it with those stored in memory. If the security code in the system is a valid code, step 56 is executed wherein the key is removed, thereby initiating program mode. Program mode is comprised of a short period of time (e.g., 10 seconds) established by starting a timer in step 56. If the time period has expired in step 58, the program reverts to the end of the program at step 68. If a key with a previously unprogrammed security value is placed into the lock cylinder of the system in step 60 and rotated before the time period has not expired then the microprocessor reads the unprogrammed security code from the key in step 62. If the security code contained on the key is already a programmed code, step 64 will prevent the system from storing the code twice by going to the end of the program in step 68. If the security code is not a previously stored security code, the unprogrammed security code is stored in the memory in step 66. The newly programmed security code value, once stored in the memory becomes a valid security code. The program sequence is ended at step 68.

In an alternative embodiment, additional steps 70 and step 72 are executed before the security code is added to the memory in step 66. Step 70 requires a key with a previously programmed security code to be placed back into the lock cylinder to be read by the microprocessor. The key is checked in step 72 to verify that the security code is valid. If the key is not valid, the system will end at step 68. If the code is valid, the new key security code will be entered into the memory in step 66. The microprocessor will end program mode at step 68 upon the entry of the security code to memory.

In a preferred embodiment, the memory is capable of storing about which exceeds the requirements of an average consumer. However, since the memory might eventually contain both active and inactive codes, and since it may be desirable to remove a code if a key is misplaced or stolen. The present invention provides a sequence for clearing the memory.

Referring back to step 54, if the code was not one previously stored in the memory, the microprocessor enters a reprogram mode in which the system memory can be cleared and in which the key used to clear the system memory becomes the first valid security code to be stored. If any of the steps in reprogram mode are not precisely followed, the microprocessor will jump to step 68 without clearing or reprogramming the memory. The reprogram sequence takes over 45 minutes in total to discourage a thief from breaching the security of the system while still allowing a stranded person without access to a valid key to reprogram a new key. In step 80, the key must be left inactive in the lock cylinder for a randomly selected period of time, the length of which is controlled by the CPU. Once the time has expired, the LED is illuminated to indicate that the key must be rotated to the off position within a short period of time in step 82. The key must then be rotated to the on position within a short period of time when signalled again by the LED in step 84. A check is made in step 86 to determine whether the user has properly responded to the LED signal a predetermined number of times. The present system needs three times through the system in order to perform the reprogramming. If the system is not in its third time through in step 86 the system will repeat step 80 where the CPU waits again for a randomly generated time period. The total time period for three times through the loop of steps 80 through 86 is preferably over 45 minutes. Each individual key-on time is randomly selected so it would be difficult or impossible to use automatic equipment to clear the memory. This will help to discourage unauthorized reprogramming of the system.

After the third successful response, all the codes stored in the system are cleared and the security code of the new key is stored in step 88. The security system now recognizes the new key as a valid key and the programming sequence ends in step 68.

The time periods used in the specification are preferred times, however the times can be varied without deviating from the scope of the invention.

What is claimed is:

1. An apparatus for programming the electronic security code of a key into the memory of a security system comprising:
   a timer;
   a memory storing security codes; and
   a microprocessor programmed to read the electronic security code of a key inserted in the system, compare the electronic security code with said stored security codes, and if said electronic security code matches a stored code and if that key is removed and then a spare key having a previously unstored electronic security code is inserted into and removed from the system within a predetermined period of time, and then said key with a previously stored electronic security code is reinserted into the system after removing the key with the previously unstored electronic security code, storing said previously unstored electronic security code in said memory in response to receiving said first electronic security code.

2. A method for programming a security system having a lock, a timer and a memory containing a first electronic security code to accept a spare key having a second electronic security code which was not previously stored into said memory, comprising the steps of:
   inserting a first key having said first electronic security code into said lock;
   rotating said first key in said lock;
   reading said first electronic security code of said first key;
   verifying said first key is valid by comparing said first electronic security code received from said first key with the security codes in said memory and finding said first electronic security code stored in said memory;
   removing said first key from said lock thereby initializing said timer;
   inserting said spare key into said lock before said timer counts a predetermined time period;
   reading said second electronic security code of said spare key;
   reinserting said first key into said lock before termination of a predetermined period of time counted by the timer; and
   storing said second electronic security code in said memory in response to receiving said first electronic security code.

* * * * *